United States Patent Office 3,369,975
Patented Feb. 20, 1968

3,369,975
METHOD FOR THE FERMENTATIVE SYNTHESIS OF 5'-URIDYLIC ACID
Kiyoshi Nakayama, Sagamihara-shi, and Haruo Tanaka, Tokyo, Japan, assignors to Kyowa Hakko Kogyo Co., Ltd., Tokyo, Japan, a corporation of Japan
No Drawing. Continuation-in-part of application Ser. No. 434,112, Feb. 19, 1965. This application Nov. 29, 1966, Ser. No. 597,549
Claims priority, application Japan, Feb. 24, 1964, 39/9,266
5 Claims. (Cl. 195—28)

ABSTRACT OF THE DISCLOSURE

5'-uridylic acid is produced by fermentation of a nutrient medium containing fermentable carbon and nitrogen sources, orotic acid or a derivative (salts of orotic acid or orotidine), phosphate from about 0.5% to about 2.5% by weight, magnesium sulfate from about 1% to about 2% by weight, and an inorganic salt (e.g. calcium chloride).

---

This application is a continuation-in-part of copending application Ser. No. 434,112, filed on Feb. 19, 1965, and now abandoned.

The present invention is concerned with the production of 5'-uridylic acid:

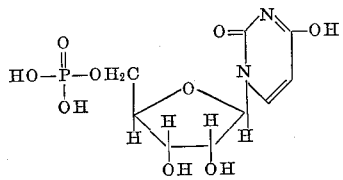

which is an important intermediate in the production of nucleic acid and derivatives thereof.

The primary object of this invention is the development of a commercially feasible, i.e low cost and high yield, method for the production of 5'-uridylic acid. Briefly stated, this object is realized by the expedient of effecting fermentation of a fermentable nutrient medium, i.e. a culture medium which contains fermentable carbon and nitrogen sources, as well as—according to this invention—orotic acid or its derivatives (salts of orotic acid and orotidine), together with a phosphate and magnesium sulfate, which fermentable medium is utilizable by *Brevibacterium ammoniagenes* microorganisms for the conversion of the said orotic acid or its said derivatives into 5'-uridylic acid. The orotic acid as such or in the form of a salt thereof or the orotidine can be added to the culture medium at any stage of the fermentation process, i.e. at the beginning or during the progress thereof.

The medium itself, except for the presence of the said added substance (orotic acid, orotic acid salt or orotidine) must contain phosphate in an amount from about 0.5 to about 2.5%, by weight, as $PO_4$, and magnesium sulfate in an amount from about 1 to about 2%, by weight. Examples of phosphate which may be employed are potassium phosphate and sodium phosphate. Otherwise the composition of the medium may be that normally employed for the culture of *Brevibacterium ammoniagenes*. Thus, use can be made of media which contain appropriate amounts of carbohydrates or other carbon sources (glucose, starch hydrolysates, molasses, etc.), nitrogen sources (urea, ammonium chloride, ammonium nitrate, etc.), inorganic compounds (such as calcium chloride) and natural substances with nitrogen (corn steep liquor, yeast extract, meat extract, peptone, fish meal, etc.) in conventionally appropriate amounts. When use is made of a *Brevibacterium ammoniagenes* strain with a specific nutritional requirement, the appropriate nutrient to satisfy the growth requirement is added to the culture medium. The orotic acid or its salt or orotidine is added to the said medium—composed as precedingly indicated—all at one time at the beginning or during the course of the fermentation or intermittently in small portions during the course of the latter.

The fermentation itself proceeds in manner per se conventional for the culture of *Brevibacterium ammoniagenes*, i.e. is carried out aerobically, by submerged or shaking culture, at a temperature of 20° to 40° C. at a pH of 5.5 to 9.0 until there is a maximum accumulation of 5'-uridylic acid in the fermentation broth and in the bacteria cells, usually for a period of about 2 to 8 days.

Upon completion of the fermentative conversion of the orotic acid or salt thereof or of the orotidine into the objective 5'-uridylic acid, the latter is recovered from the fermentation broth by any of the well known and per se conventional methods for recovering fermentative conversion products, i.e. by an ion exchange adsorption method, precipitation method, extraction method, etc.

The results of the experiments carried out on the effect of the concentrations of $PO_4$ and $MgSO_4$ to be added to the medium, which affect the amount of 5'-uridylic acid produced, are tabulated in Table 1. The experiments were carried out in accordance with the method as in Example 1, but the concentrations of $PO_4$ and $MgSO_4$ to be added to the medium were varied and *Brevibacterium ammoniagenes* ATCC–15750 was used as a seed strain.

TABLE 1

| Concentration in the medium (percent) by weight | | | | Amount of 5'-uridylic acid produced (mg./ml.) |
|---|---|---|---|---|
| $K_2HPO_4$ | $KH_2PO_4$ | $PO_4$ present in the $K_2HPO_4$ and $KH_2PO_4$ | $MgSO_4.7H_2O$ | |
| 2.0 | 2.0 | 2.46 | 2.0 | 3.1 |
| 1.5 | 1.5 | 1.84 | 2.0 | 4.2 |
| 1.5 | 1.5 | 1.84 | 1.2 | 4.0 |
| 1.0 | 1.0 | 1.23 | 2.0 | 2.5 |
| 1.0 | 1.0 | 1.23 | 1.5 | 3.3 |
| 1.0 | 1.0 | 1.23 | 1.2 | 2.9 |
| 0.5 | 0.5 | 0.61 | 0.5 | 0.8 |
| 0.5 | 0.5 | 0.61 | 1.0 | 2.0 |

The following are illustrative but non-limitative examples of a presently preferred embodiment of the invention. Parts by weight bear the same relation to parts by volume as do grams to milliliters. Percentages are by weight unless otherwise indicated.

Example 1

*Brevibacterium ammoniagenes* (ATCC–6872) is inoculated into a culture medium consisting of

| | |
|---|---|
| Glucose | percent__ 2 |
| Peptone | do___ 1 |
| Yeast extract | do___ 1 |
| NaCl | do___ 0.3 | and

| | |
|---|---|
| Biotin | μg. (gammas)__ 30 |
| Remainder water ad | liter__ 1 | and incubation allowed to proceed at 30° C. for 24 hours.

Ten percent by volume of the thus-obtained inoculum is inoculated into fermentation medium of the composition:

| | |
|---|---|
| Glucose | grams__ 100 |
| Urea | do___ 6 |
| $K_2HPO_4$ | do___ 10 |
| $KH_2PO_4$ | do___ 10 |
| $MgSO_4 \cdot 7H_2O$ | do___ 10 |
| $CaCl_2 \cdot 2H_2O$ | do___ 0.1 |
| Yeast extract | do___ 10 | and

| | |
|---|---|
| Biotin | μg. (gammas)__ 30 | per liter of water. The pH of the medium is adjusted to 8.0 with NaOH. (Note. Sterilization of the fermentation medium is preliminarily carried out in a pressurized sterilizer (1 kg./cm.$^2$) for 10 minutes.)

Submerged aerobic culture is carried out at 30° C. This may be carried out, if desired, in 250 milliliter flasks each containing 20 milliliters of the fermentation medium inoculated as precedingly described. It may equally well be carried out on a large scale according to which, for example, a liter or more of inoculated fermentation medium is subjected to the submerged aerobic treatment in a correspondingly large receptacle provided with stirring devices, heaters, etc.

After 48-hours culture, orotic acid is added to the fermentation liquid in such amount as to be present in the latter in a concentration of 2 milligrams per milliliter (2 grams per liter). Culturing is continued as before for 24 more hours. As a result, 2.5 milligrams per milliliter (2.5 grams per liter) of 5'-uridylic acid is accumulated in the fermentation liquor.

In this example the concentration of $K_2HPO_4$, $KH_2PO_4$, and magnesium sulphate in the fermentation medium is .1% by weight for each, and the concentration of phosphate by weight as $PO_4$ is 1.23%.

The so-produced 5'-uridylic acid is isolated from the reaction mixture in any suitable and per se conventional manner, the particular mode of isolation not being per se part of the present invention. 5'-uridylic acid is a known compound and has heretofore been recovered from reaction mixtures containing the same.

Essentially the same results are obtained by replacing the orotic acid by an equivalent amount of a salt thereof, such as ammonium orotate, etc.

*Example 2*

The same procedure as in Example 1 is carried out, except that orotidine instead of orotic acid is added to the culture medium. The orotidine is added entirely at the beginning of the culturing process and in such amount as to provide a concentration thereof of 4-milligrams per milliliter (4 grams per liter) in the fermentation medium. After 72-hours culture, 2.4 milligrams per milliliter of 5'-uridylic acid (2.4 grams per liter) are accumulated in the fermentation liquor.

*Example 3*

The same procedure as in Example 1 is carried out except that as the microorganism used *Brevibacterium ammoniagenes* ATCC 6871, 15750, 15751 instead of *Brevibacterium ammoniagenes* ATCC 6872 used in Example 1. The amount of 5'-uridylic acid accumulated after cultivating for 72 hrs. is shown in Table 2 below.

TABLE 2

| *Brevibacterium ammoniagenes*: | 5'-uridylic acid accumulated (mg./ml.) |
|---|---|
| ATCC–6871 | 2.6 |
| ATCC–15750 | 2.9 |
| ATCC–15751 | 2.3 |

*Example 4*

The same procedure as in Example 1 is carried out except that the following fermentation medium is used instead of that used in Example 1.

| | | |
|---|---|---|
| Glucose | grams/l | 100 |
| Urea | do | 6 |
| $Na_2HPO_4$ | do | 14 |
| $NaH_2PO_4$ | do | 6 |
| $MgSO_4 \cdot 7H_2O$ | do | 20 |
| $CaCl_2 \cdot 2H_2O$ | do | 0.1 |
| Yeast extract | do | 10 |
| Biotin | μg./l | 30 |

The amount of 5'-uridylic acid accumulated after culturing for 72 hours is 2.5 milligrams per milliliter of the broth.

What is claimed is:

1. A fermentative process for the production of 5'-uridylic acid which comprises culturing *Brevibacterium ammoniagenes* under aerobic conditions in an aqueous nutrient medium containing a member selected from the group consisting of orotic acid, acid addition salts of the latter and orotidine and also containing phosphate in an amount from about 0.5% to about 2.5% by weight as $PO_4$, and magnesium sulfate in an amount from about 1% to about 2% by weight, whereby fermentative production of 5'-uridylic acid takes place, and continuing the conversion until significant quantities of said acid have been produced and recovering the 5'-uridylic acid.

2. A process according to claim 1, wherein the nutrient medium contains phosphate in an amount of at least about 1% by weight as $PO_4$.

3. A process according to claim 1, wherein the microorganism cultured is *Brevibacterium ammoniagenes* ATCC–6872.

4. A process according to claim 1, wherein the microorganism cultured is *Brevibacterium ammoniagenes* ATCC–6871.

5. A process according to claim 1, wherein the microorganism cultured is *Brevibacterium ammoniagenes* ATCC–15750.

References Cited

UNITED STATES PATENTS

| 3,214,344 | 10/1965 | Kinoshita et al. | 195—28 |
| 3,268,415 | 8/1966 | Kinoshita et al. | 195—28 |

ALVIN E. TANENHOLTZ, *Primary Examiner.*